(12) United States Patent
He et al.

(10) Patent No.: US 8,111,755 B2
(45) Date of Patent: Feb. 7, 2012

(54) METHOD AND SYSTEM FOR LOW-COMPLEXITY SLEPIAN-WOLF RATE ESTIMATION IN WYNER-ZIV VIDEO ENCODING

(75) Inventors: Dake He, Waterloo (CA); Ashish Jagmohan, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 12/145,920

(22) Filed: Jun. 25, 2008

(65) Prior Publication Data

US 2009/0323798 A1   Dec. 31, 2009

(51) Int. Cl.
*H04N 7/12* (2006.01)

(52) U.S. Cl. .............. 375/240.23; 375/240.24; 348/353; 715/744

(58) Field of Classification Search ............. 375/240.23, 375/240.24; 348/353, 365, 370, 744; 715/722
See application file for complete search history.

(56) References Cited

U.S. PATENT DOCUMENTS

| | | | |
|---|---|---|---|
| 7,233,269 | B1 | 6/2007 | Chen et al. |
| 2004/0194008 | A1 | 9/2004 | Garudadri et al. |
| 2005/0031219 | A1 | 2/2005 | Puri et al. |
| 2005/0268200 | A1 | 12/2005 | Garudadri et al. |
| 2006/0171455 | A1 | 8/2006 | Mohsenian |
| 2006/0176953 | A1 | 8/2006 | Mohsenian |
| 2006/0197690 | A1 | 9/2006 | Liu et al. |
| 2006/0200733 | A1 | 9/2006 | Stankovic et al. |
| 2006/0233238 | A1 | 10/2006 | Hinds |
| 2007/0013561 | A1 | 1/2007 | Xu et al. |
| 2007/0217522 | A1 | 9/2007 | Sun et al. |
| 2008/0019443 | A1 | 1/2008 | He et al. |
| 2008/0031344 | A1 | 2/2008 | Lu et al. |
| 2008/0048895 | A1 | 2/2008 | Liu et al. |
| 2008/0106444 | A1* | 5/2008 | Liu et al. .......... 341/56 |

(Continued)

FOREIGN PATENT DOCUMENTS

WO    2005/043882    6/2008

OTHER PUBLICATIONS

A. Aaron et al.; "Transform-domain Wyner-Ziv Codec for Video"; Proc. SPIE Visual Communications and Image Processing, San Jose, CA, Jan. 2004; pp. 1-9.

(Continued)

*Primary Examiner* — Andrew Lee
(74) *Attorney, Agent, or Firm* — Whitham, Curtis, Christofferson & Cook, P.C.; Brian P. Verminski

(57) ABSTRACT

A method and system for low-complexity Slepian-Wolf rate estimator in a hybrid Wyner-Ziv video encoder determines the minimum Slepian-Wolf code rate required to allow correct decoding. The Slepian-Wolf estimator does not assume ideality of source and side-information statistics and does not require the presence of a feedback channel from the decoder to the encoder in order to determine the correct Slepian-Wolf coding rate. Instead, it adapts to the statistical properties of the video steam. The Slepian-Wolf estimator provides very efficient compression performance while avoiding Slepian-Wolf decoding failures.

17 Claims, 4 Drawing Sheets

Low-complexity hybrid Wyner-Ziv encoder

U.S. PATENT DOCUMENTS

| | | | |
|---|---|---|---|
| 2008/0189073 A1* | 8/2008 | Jagmohan et al. | 702/181 |
| 2008/0279281 A1* | 11/2008 | Draper et al. | 375/240.22 |
| 2008/0291065 A1* | 11/2008 | Lu et al. | 341/107 |
| 2009/0031191 A1* | 1/2009 | Yang et al. | 714/758 |
| 2009/0228757 A1* | 9/2009 | Nishi | 714/752 |
| 2009/0245372 A1* | 10/2009 | Yamasaki | 375/240.15 |
| 2010/0208801 A1* | 8/2010 | Yamasaki | 375/240.12 |
| 2010/0226431 A1* | 9/2010 | Yamasaki | 375/240.12 |
| 2011/0029846 A1* | 2/2011 | Stankovic et al. | 714/785 |
| 2011/0052087 A1* | 3/2011 | Mukherjee | 382/248 |
| 2011/0075733 A1* | 3/2011 | Yamasaki | 375/240.12 |
| 2011/0161776 A1* | 6/2011 | Liu et al. | 714/755 |

OTHER PUBLICATIONS

J. Ascenso et al.; "Motion compensated refinement for low complexity pixel based distributed video coding"; Proc. Advanced Video and Signal Based Surveillance, 2005; pp. 1-6.

Y. Yang et al.; "Wyner-Ziv coding based on TCQ and LDPC codes"; Proc. 37th Asilomar Conference on Signals, Systems, and Computers; Pacific Grove, CA; Nov. 2003; pp. 825-829.

Brites, C., et al., "Encoder Rate Control for Transform Domain Wyner-Zin Video Coding", Instituto Superior Tecnico-Instituto de Telecomunicacoes.

\* cited by examiner

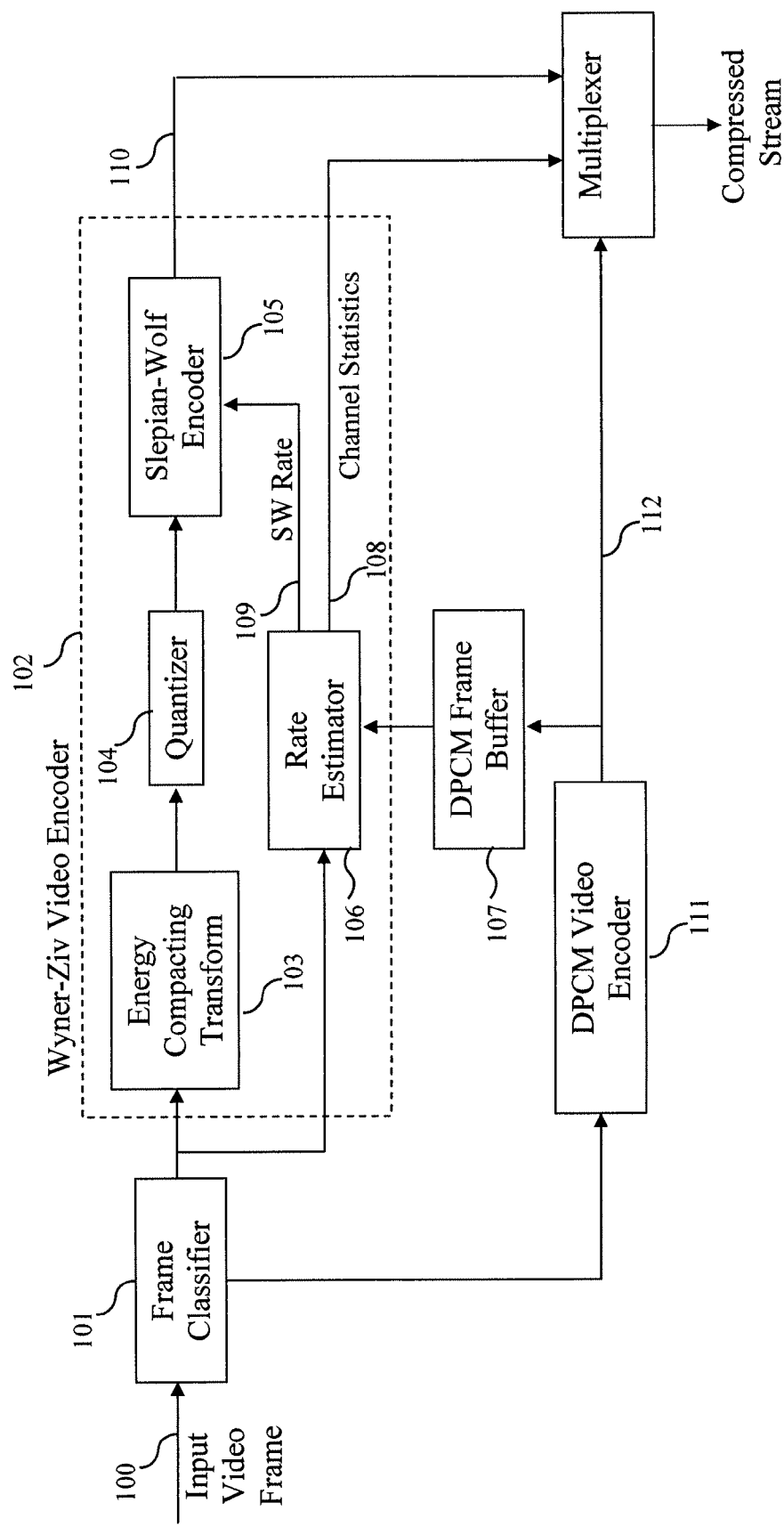
FIGURE 1. Low-complexity hybrid Wyner-Ziv encoder

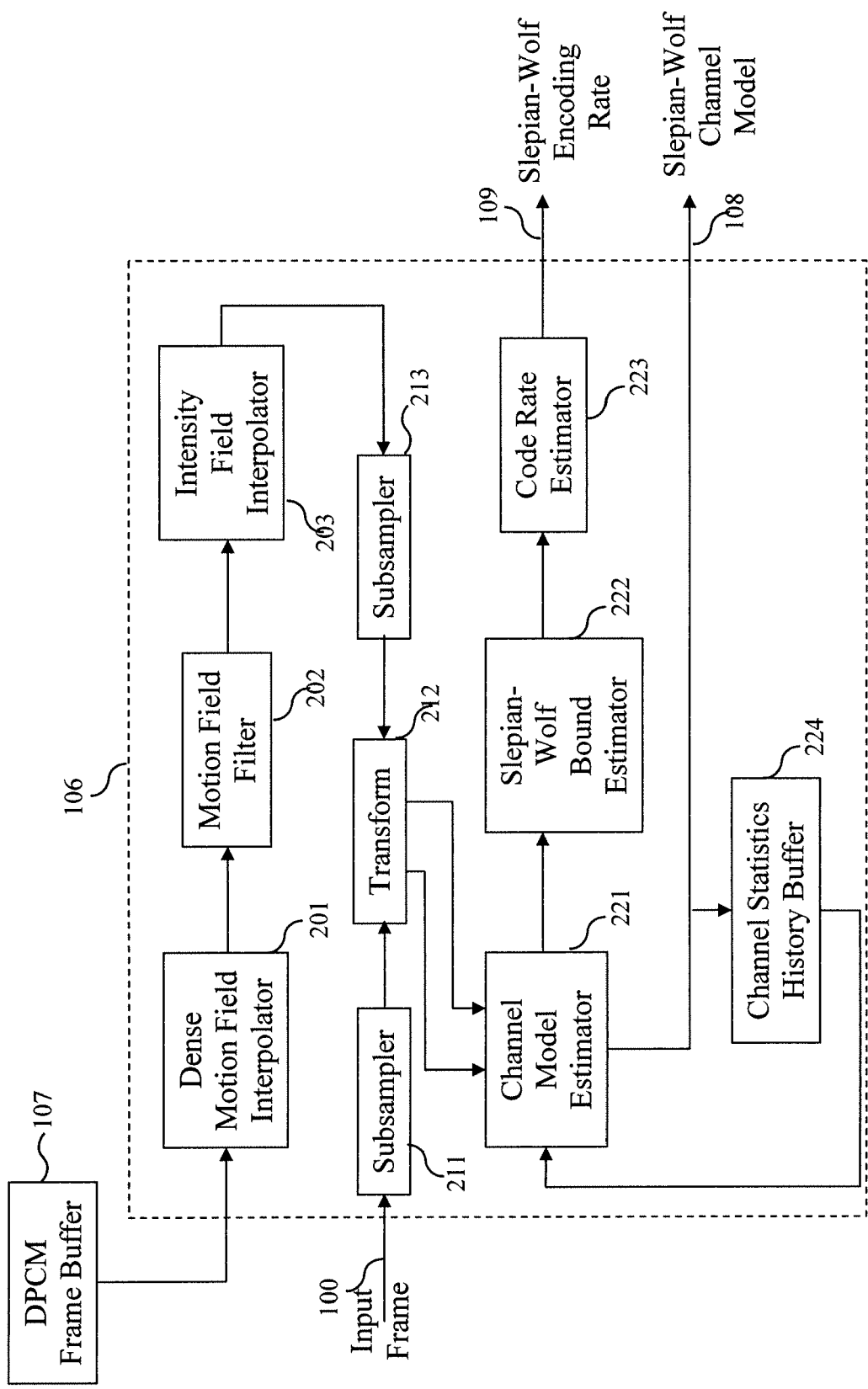
FIGURE 2. Low-Complexity Rate Estimator

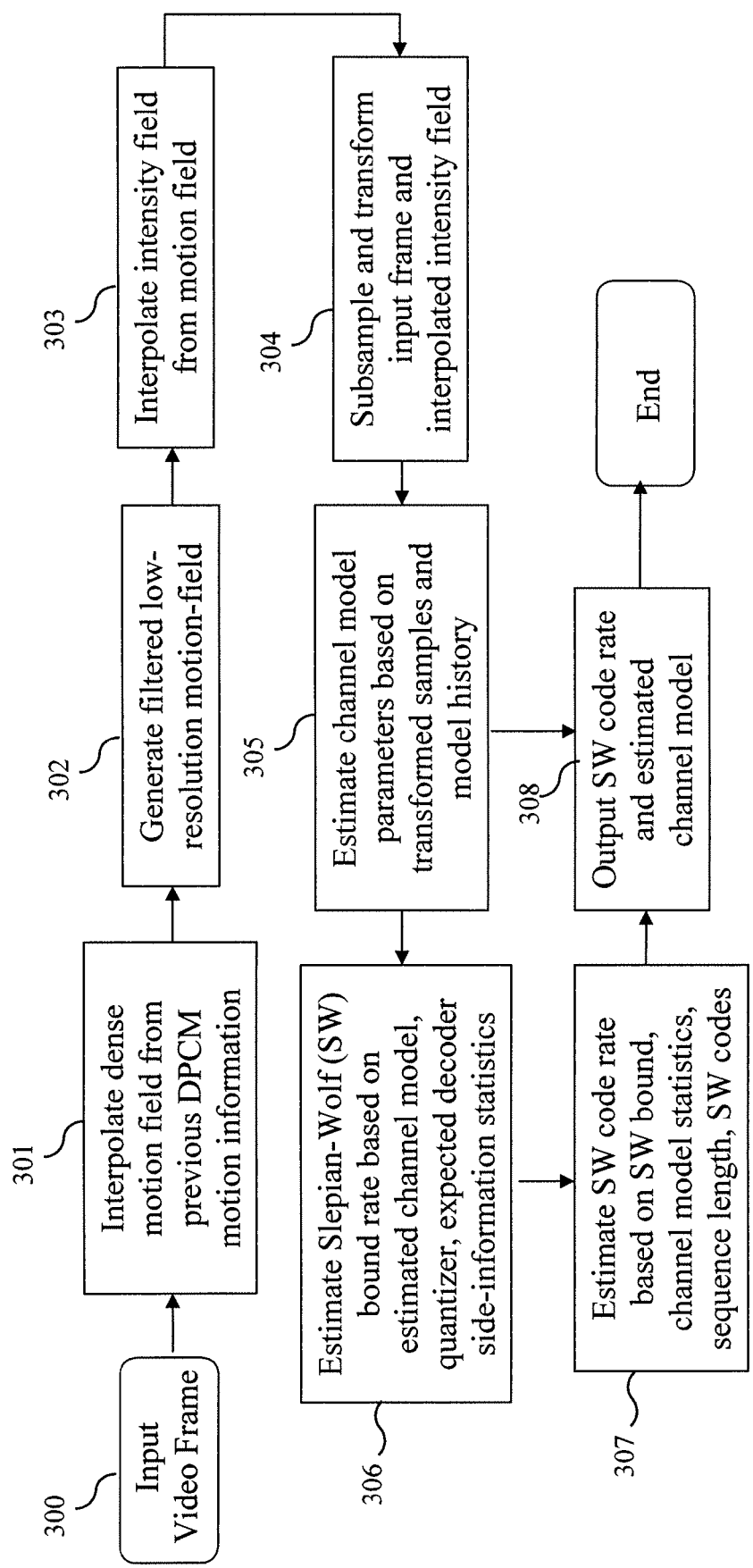
FIGURE 3. Flow diagram of rate estimation method for hybrid Wyner-Ziv encoding.

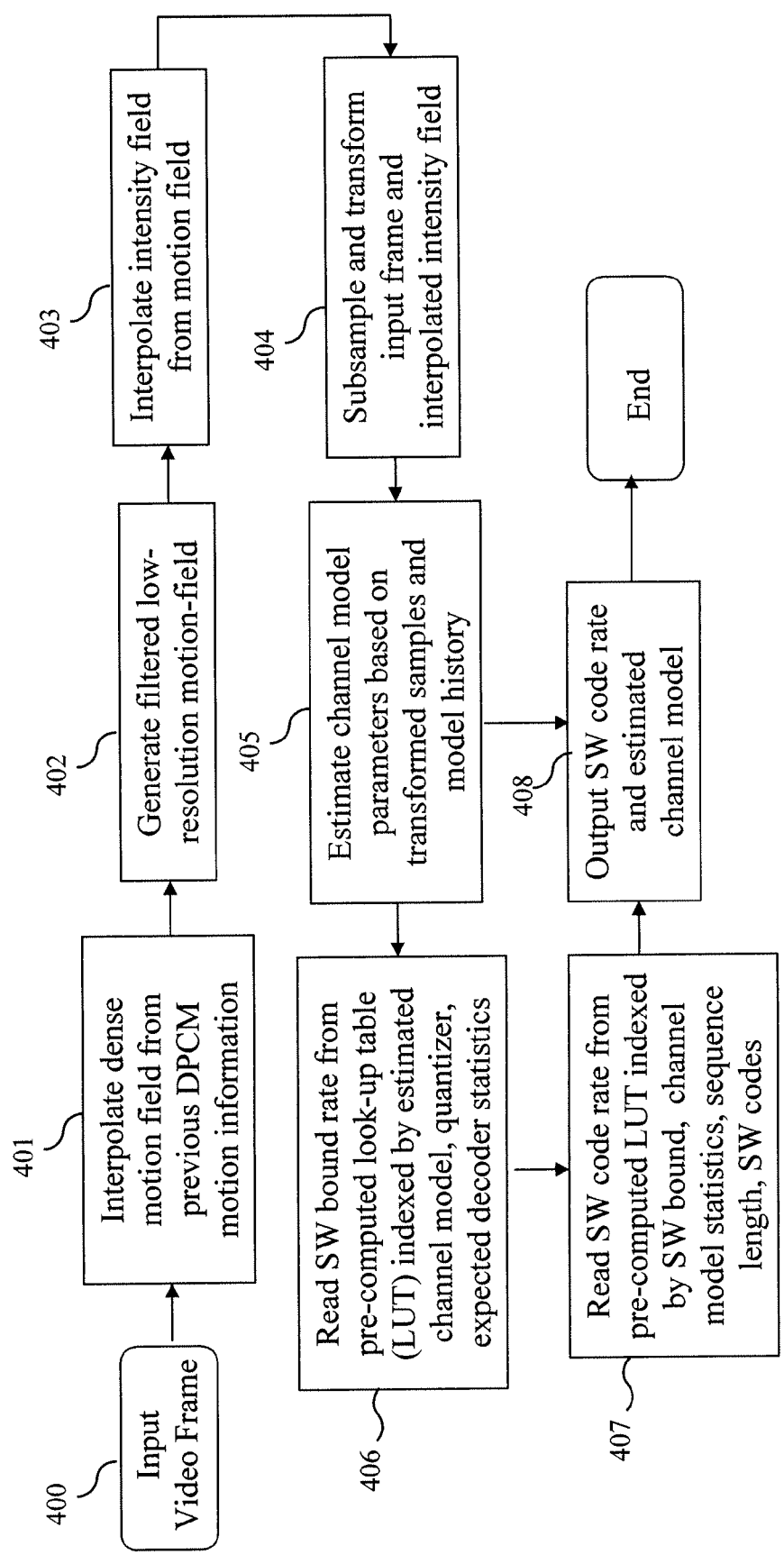
FIGURE 4. Flow diagram of rate estimation method using look-up tables.

METHOD AND SYSTEM FOR LOW-COMPLEXITY SLEPIAN-WOLF RATE ESTIMATION IN WYNER-ZIV VIDEO ENCODING

BACKGROUND OF THE INVENTION

1. Field of the Invention

The present application generally relates to an encoder rate-estimation method and system which does not require any decoder feedback and, more particularly, to Slepian-Wolf code rate estimation in a Wyner-Ziv encoder which allows for correct decoding of compressed data.

2. Background Description

H.264 is a standard for video compression. It is also known as MPEG-4 Part 10, or MPEG-4 AVC (for Advanced Video Coding). Conventional video compression systems such as the H.26*, MPEG* standards are based on the use of differential predictive encoding. This involves the encoder generating a good temporal predictor for the current video frame by the process of block-based motion estimation. The difference between the current video frame and the predictor frame is lossily compressed using transform coding, quantization and entropy coding. The compressed motion and difference information constitute the encoded bitstream. The decoder reconstructs the video frame by decoding the motion and difference information, and using a process of motion compensation.

While motion estimation provides efficient compression, it has a high computational cost; it usually takes a half or more of the total encoding computation complexity, depending on the motion estimation scheme used. Thus, in conventional video codecs, the encoder tends to be computationally heavy while the decoder tends to be computationally light. In many emerging applications, however, there is a need for low-complexity encoders, while computationally heavy decoders are allowable. Such applications include video surveillance, mobile multimedia and mobile video conferencing, battle field video communications, etc.

Wyner-Ziv video coding is a new video compression paradigm which has the potential of reversing the traditional distribution of complexity in video codecs (coder/decoders); in other words, using Wyner-Ziv coding it is possible to design a video codec wherein the encoder is computationally inexpensive, while the decoder is computationally heavy. The Wyner-Ziv and Slepian-Wolf theorems in information theory address the problem of compressing a source with a correlated random variable (termed the "side-information") available only at the decoder. The theorems show that it is possible to achieve efficient compression in such a case (though the proofs are non-constructive).

The video compression problem can be formulated as a problem of source coding with side-information by treating the current video frame as the source, and predictor video frames as side-information. The encoder does not need to perform motion estimation, and is hence computationally light. Instead, to compress the current video frame, the encoder performs transform coding and quantization of the frame itself, and then passes the quantized coefficients as inputs to a Slepian-Wolf code. The output of the Slepian-Wolf code (as well as certain statistical information) serves as the compressed representation of the frame. The decoder generates side-information for the current frame from previously decoded frames, and uses Slepian-Wolf decoding to reconstruct it. In practice, hybrid Wyner-Ziv coding is often used, wherein every nth video frame is encoded using differential prediction, while all other frames are encoded using Wyner-Ziv coding.

A critical problem in designing an efficient Wyner-Ziv codec is the problem of rate estimation at the encoder. This refers to correctly estimating the rate to be used for Slepian-Wolf coding of the quantized transform coefficients of the Wyner-Ziv coded frames. The reason that the accuracy of rate estimation is critical to the performance of the overall Wyner-Ziv video compression system is as follows. If the Slepian-Wolf coding rate is too low, the Slepian-Wolf decoding fails, and the decoder reconstruction will be erroneous (and will typically have very high distortion). On the other hand, if a large Slepian-Wolf coding rate is used, compression efficiency is sacrificed. Since the encoder is constrained to have low complexity, it is imperative that the computational cost or rate estimation be low. The key challenges in performing accurate, low-complexity rate estimation are several; these include forming good source-side-information channel model estimates with low computational cost, and estimating the Slepian-Wolf code rate correctly for non-ideal, finite-length Slepian-Wolf codes.

Rate estimation methods in prior hybrid Wyner-Ziv coding systems can be classified into the following categories. The first class of methods assumes that the encoder has knowledge of the joint statistics of the source and the side-information, because the source and the side-information derive from ideal random processes. Examples of this class of solutions include the methods described in U.S. Patent Application Publication US20060297690A1 of Liu et al. for "Data Encoding and Decoding Using Slepian-Wolf Coded Nested Quantization to Achieve Wyner-Ziv Coding" and Y. Yang et al., "Wyner-Ziv coding based on TCQ and LDPC codes", Proc. $37^{th}$ Asilomar Conference on Signals, Systems, and Computers, Pacific Grove, Calif., November 2003. The main shortcoming of these approaches in the context of the current problem is that the assumption of ideality of statistics does not hold when dealing with real-world video sources.

The second class of methods utilizes decoder feedback in order to determine the current Slepian-Wolf coding rate. Specifically, if the decoder fails to decode the current frame given the Slepian-Wolf code bits it has received, it requests the encoder for more code bits. Examples of this include the methods described in A. Aaron et al., "Transform domain Wyner-Ziv codec for video", Proc. SPIE Visual Communications and Image Processing, San Jose, Calif. January 2004, and J. Ascenso et al., "Motion compensated refinement for low complexity pixel based distributed video coding", Proc. Advanced Video and Signal Based Surveillance, 2005. The main shortcoming of these approaches is that the instantaneous decoder feedback these require is impractical for most video communications applications due to practical network delay constraints, and the absence of feedback links in applications like video surveillance.

The third class of methods utilizes block-based classifiers learned off-line in order to select the Slepian-Wolf coding rate for individual frame blocks. Examples of this class are the methods described in WO2005/043882A2 for "Video source coding with side information" and U.S. Patent Application Publication US2004/0194008A1 of Garudardi et al. for "Method, Apparatus, and System for Encoding and Decoding Side Information for Multimedia Transmission." The main shortcomings of this approach is that block-based off-line classification is inaccurate and, by necessity, restricted to a small set of discrete rates from which the correct rate is to be selected. This leads to inefficient compression performance.

SUMMARY OF THE INVENTION

According to the present invention, there is provided a method and system for low-complexity Slepian-Wolf rate estimation in a hybrid Wyner-Ziv video encoder, which determines the minimum Slepian-Wolf rate required to allow correct decoding. The preferred embodiment of the invention includes:

1. Dense motion field interpolation for the current frame based on the motion vectors of temporally differentially predicted frames;
2. Motion field filtering to generate a regular block-wise motion field for the current frame;
3. Intensity field interpolation based on the regular motion field and the temporally neighboring frames;
4. Subsampling of the current frame and the interpolated intensity field to reduce the number of samples (and hence complexity) in subsequent steps;
5. Transform domain conversion of the current frame and the interpolated intensity field;
6. Channel model estimation based on the subsampled transform domain coefficients of the current frame and the interpolated intensity field, which consists of determining one of a parameterized class of models which best fits the observed transform coefficients and prior channel model estimates;
7. Slepian-Wolf bound estimation which determines the Slepian-Wolf bound based on the channel model estimate; and
8. Code rate estimation which determines the correct Slepian-Wolf coding rate to use in encoding.

The key advantages of the invention are as follows. Firstly, it does not assume ideality of source and side-information statistics, and it does not require the presence of a feedback channel from the decoder to the encoder in order to determine the correct Slepian-Wolf coding rate. Instead, it adapts to the statistical properties of the video stream. Secondly, it provides very efficient compression performance, while avoiding Slepian-Wolf decoding failures.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram of the low-complexity hybrid Wyner-Ziv encoder according to the preferred embodiment of the invention;

FIG. 2 is a block diagram of the low-complexity rate estimator according to the preferred embodiment of the invention;

FIG. 3 is a flow diagram of the low-complexity rate estimation method according to the preferred embodiment of the invention; and FIG. 4 is a flow diagram of the low-complexity rate estimation method according to an alternative embodiment of the invention.

DETAILED DESCRIPTION OF A PREFERRED EMBODIMENT OF THE INVENTION

Referring now to the drawings, and more particularly to FIG. 1, there is illustrated an exemplary embodiment of a hybrid low-complexity Wyner-Ziv video encoder. The input video frame 100 is input to a frame classifier 101 which makes a decision on whether the frame should be encoded as a Wyner-Ziv frame or a differentially predicted (DPCM) video frame. If the frame is to be encoded as a Wyner-Ziv frame, it is input to the Wyner-Ziv encoder 102. The Wyner-Ziv encoder 102 consists of the energy-compacting transform means 103, the quantizer 104, the Slepian-Wolf encoder 105 and the rate estimator 106. The rate estimator 106 uses the current frame and frames from the DPCM frame buffer 107 to estimate the Slepian-Wolf channel model 108 and the Slepian-Wolf (SW) rate 109. The Slepian-Wolf channel model statistics 108 are output to be used by the decoder for Slepian-Wolf decoding. The Slepian-Wolf code rate 109 is input to the Slepian-Wolf encoder 105, which uses the rate 109 to determine the appropriate Slepian-Wolf code to use in order to compress the quantized transform coefficients of the current video frame. If the frame is to be encoded as a differentially predicted frame, it is input to the DPCM video encoder 111 where it is encoded using motion estimation, transform coding, quantization and entropy coding. The reconstructed DPCM frame is stored in the DPCM frame buffer 107 for future use. The DPCM encoded bitstream 112, the Wyner-Ziv encoded bitstream 110, and the channel model statistics 108 together constitute the compressed representation of the video sequence.

FIG. 2 depicts the preferred embodiment of the low-complexity Slepian-Wolf code rate estimator 106 of FIG. 1. The DPCM frame buffer 107 contains reconstructions of previously encoded DPCM frames and their motion information. This information is input to the dense motion field interpolator 201, which generates a pixel-wise dense motion field for the current frame as a function of the previous motion vectors, the goodness of fit of previous motion information, and the frame indices of the current frame and previous DPCM frames. The dense motion field is input to the motion field filter 202 which generates a regular, block-wise coarse motion field for the current frame. The generation of the block-wise motion field is done on the basis of the dense motion field and motion statistics including statistics which measure the accuracy of the motion vector at each pixel. In an exemplary embodiment, the motion field filter is a space-varying linear filter whose weights are a function of the said accuracy statistics, wherein the statistics for a given motion vector are derived as a function of the intensity differences of pixels in previously encoded DPCM frames brought into correspondence by the vector. In an alternative exemplary embodiment, the motion field filter is a non-linear filter wherein the weights are a function of the deviation of each motion vector from its spatially neighboring motion vectors.

The block-wise motion field generated by motion field filter 202 is input to the intensity field interpolator 203. The intensity field interpolator 203 computes an intensity field on the basis of the block-wise motion field and the intensities of previously encoded DPCM frames. In an exemplary embodiment, the intensity field is interpolated as a linear function of intensity values from previously encoded DPCM frames, wherein the linear weights are a function of the frame indices. In an additional exemplary embodiment, the intensity field is interpolated as a non-linear weighted sum of intensity values from previously encoded DPCM frames, wherein the non-linear weights are a function of the deviation of the intensity block from one DPCM frame from the average value of the intensity blocks being summed. The interpolated intensity field is input to the subsampler 213, which generates a small subset of samples from the interpolated field. The current input frame 100 is also input to a subsampler 211, which similarly generates a small subset of samples from it. Both sets of samples are input to the transform means 212 which computes corresponding energy-compacting transforms from these samples. The two sets of transformed samples are then input to the channel model estimator 221.

The channel model estimator 221 estimates the statistics of the virtual channel between the source frame 100, output from the frame classifier 101, and the decoder side-information. In the preferred embodiment, this is done by estimating the best fitting parameters of a parameterized probability density of the source given the decoder side information. In an exemplary embodiment, this parameterized probability density is a Generalized Gaussian density. The statistics estimation is computed as a function of previously computed statistics stored in the channel statistics history buffer 224, the two sets of transform coefficients obtained from the transform means 212, and the choice of parameterized probability distributions. In an exemplary embodiment, the parameters of the Generalized Gaussian density are computed using a maximum-likelihood estimator which is used to perform a LMS-type update on the previously computed channel statistics. In an additional exemplary embodiment, the parameters of the Generalized Gaussian density are computed using a low-complexity approximate maximum-likelihood estimator (such as the moment-equalizing estimator) which is used to perform a LMS-type update on the previously computed channel statistics. In an additional exemplary embodiment, the parameters of the Generalized Gaussian density are computed using a low-complexity approximate maximum-likelihood estimator (such as the moment-equalizing estimator) based on combining the sufficient statistics of the current sets of transform coefficients with the previously computed sufficient statistics.

The estimated channel model statistics are input to the channel statistics history buffer 224, for storage, and to the Slepian-Wolf bound estimator 222. The Slepian-Wolf estimator 222 computes the ideal Slepian-Wolf bound rate (as given by the Slepian-Wolf theorem) from the estimated channel model. This is done as a function of the quantizer to be used in Wyner-Ziv encoding, the estimated channel model statistics, and the expected statistics of the decoder side-information. In an exemplary low-complexity embodiment, the Slepian-Wolf bound rate for a plurality of channel model statistics, quantizers, and decoder side-information statistics is pre-computed prior to Wyner-Ziv encoding and is stored in look-up tables in memory. During rate estimation, the Slepian-Wolf bound estimator 222 reads the appropriate entries from the look-up tables based on the computed statistics and quantizer. The Slepian-Wolf bound rate and the channel model statistics are input to the code rate estimator 223. The code rate estimator 223 determines the encoding rate to be used for the non-ideal Slepian-Wolf codes available to the Wyner-Ziv encoder for encoding. This encoding rate is estimated as a function of the sequence length to be Slepian-Wolf coded and the code structure of the available Slepian-Wolf codes, in addition to the channel model statistics and the Slepian-Wolf bound rate. In an exemplary embodiment, the density evolution algorithm is used to compute the required coding rate for the available Slepian-Wolf codes from the above statistics. In an additional exemplary embodiment, the Slepian-Wolf code rate is analytically pre-computed and stored in look-up tables. The output of the code rate estimator is the Slepian-Wolf coding rate 109, which input to the Slepian-Wolf Encoder 105. The outputs of the low-complexity rate estimator 106 are the Slepian-Wolf channel model statistics 108 and the Slepian-Wolf encoding rate 109.

FIG. 3 depicts the preferred embodiment of the low-complexity Slepian-Wolf code rate estimation method. The video frame is input at step 300. First, previously computed DPCM motion information stored in the DPCM frame buffer is used to interpolate a dense motion field at step 301, the result of which is a pixel-wise dense motion field for the current frame as a function of the previous motion vectors, the goodness of fit of previous motion information, and the frame indices of the current frame and previous DPCM frames. The dense motion field is used in step 302 to generate a filtered block-wise coarse motion field for the current frame. The generation of the block-wise motion field is done on the basis of the dense motion field and motion statistics including statistics which measure the accuracy of the motion vector at each pixel. In an exemplary embodiment, step 302 uses a space-varying linear filter to process the input, dense motion field, whose weights are a function of the said accuracy statistics, wherein the statistics for a given motion vector are derived as a function of the intensity differences of pixels in previously encoded DPCM frames brought into correspondence by the vector. In an alternative exemplary embodiment, step 302 uses a a non-linear filter to process the input, dense motion field, wherein the weights are a function of the deviation of each motion vector from its spatially neighboring motion vectors.

The block-wise motion field generated in step 302 is used to compute an intensity field in step 303. This is done on the basis of the block-wise motion field and the intensities of previously encoded DPCM frames. In an exemplary embodiment, the intensity field is interpolated as a linear function of intensity values from previously encoded DPCM frames, wherein the linear weights are a function of the frame indices. In an additional exemplary embodiment, the intensity field is interpolated as a non-linear weighted sum of intensity values from previously encoded DPCM frames, wherein the non-linear weights are a function of the deviation of the intensity block from one DPCM frame from the average value of the intensity blocks being summed. In step 304, the interpolated intensity field and the input video frame, input at step 300, are subsampled to generate small subsets of samples, which are then transformed by computing energy-compacting transforms from these samples.

In step 305 the statistics of the virtual channel between the source frame 300 and the decoder side-information are computed. In the preferred embodiment, this is done by estimating the best fitting parameters of a parameterized probability density of the source given the decoder side information. In an exemplary embodiment, this parameterized probability density is a Generalized Gaussian density. These parameters are computed as a function of previously computed channel model statistics, the transformed, sub-sampled signals computed in step 304, and the choice of parameterized probability distributions. In an exemplary embodiment, the parameters of the Generalized Gaussian density are computed using a maximum-likelihood estimator which is used to perform a LMS-type update on the previously computed channel statistics. In an additional exemplary embodiment, the parameters of the Generalized Gaussian density are computed using a low-complexity approximate maximum-likelihood estimator (such as the moment-equalizing estimator) which is used to perform a LMS-type update on the previously computed channel statistics. In an additional exemplary embodiment, the parameters of the Generalized Gaussian density are computed using a low-complexity approximate maximum-likelihood estimator (such as the moment-equalizing estimator) based on combining the sufficient statistics of the current sets of transform coefficients with the previously computed sufficient statistics.

The channel statistics computed in step 305 are used in step 306 to estimate the Slepian-Wolf bound rate. Step 306 computes the Slepian-Wolf bound rate as a function of the quantizer to be used in Wyner-Ziv encoding, the estimated channel model statistics, and the expected statistics of the decoder side-information. In step 307, the encoding rate to be used for the non-ideal Slepian-Wolf codes available to the Wyner-Ziv encoder for encoding is computed as a function of the length of the sequence to be Slepian-Wolf coded, the code structure of the available Slepian-Wolf codes, the channel model statistics and the Slepian-Wolf bound rate. In an exemplary embodiment, the density evolution algorithm is used to compute the required coding rate for the available Slepian-Wolf codes from the above statistics. The output of step 307 is the Slepian-Wolf code rate. In the final step 308, the Slepian-Wolf code-rate computed in Step 307 and the channel model computed in step 305 are output. These represent the output of the rate estimation method.

FIG. 4 depicts an alternate embodiment of the low-complexity Slepian-Wolf code rate estimation method. The video frame is input at step 400. First, previously computed DPCM motion information stored in the DPCM frame buffer is used to interpolate a dense motion field 401, the result of which is a pixel-wise dense motion field for the current frame as a function of the previous motion vectors, the goodness of fit of previous motion information, and the frame indices of the current frame and previous DPCM frames. The dense motion field is used in step 402 to generate a filtered block-wise coarse motion field for the current frame. The generation of the block-wise motion field is done on the basis of the dense motion field and motion statistics including statistics which measure the accuracy of the motion vector at each pixel. The block-wise motion field generated in step 402 is used to compute an intensity field in step 403. This is done on the basis of the block-wise motion field and the intensities of previously encoded DPCM frames. In step 404, the interpolated intensity field and the input video frame 400 are subsampled to generate small subsets of samples, which are then transformed by computing energy-compacting transforms from these samples.

In step 405 the statistics of the virtual channel between the source frame 400 and the decoder side-information are computed. This is done by estimating the best fitting parameters of a parameterized probability density of the source given the decoder side information. These parameters are computed as a function of previously computed channel model statistics, the transformed, sub-sampled signals computed in step 404, and the choice of parameterized probability distributions. The channel statistics computed in step 405 are used in step 406 to estimate the Slepian-Wolf bound rate. The Slepian-Wolf bound rate for a plurality of channel model statistics, quantizers, and decoder side-information statistics is pre-computed prior to Wyner-Ziv encoding and is stored in look-up tables in memory. In step 406 the Slepian-Wolf bound rate is read by indexing the stored look-up tables on the basis of the quantizer to be used in Wyner-Ziv encoding, the estimated channel model statistics, and the expected statistics of the decoder side-information.

In step 407, the encoding rate to be used for the non-ideal Slepian-Wolf codes available to the Wyner-Ziv encoder for encoding is computed. The Slepian-Wolf coding rates for the available Slepian-Wolf codes, and a plurality of sequence lengths, channel model statistics, and Slepian-Wolf bound rates are stored in look-up tables in memory. In step 407, the estimated Slepian-Wolf code rate is read from these look-up tables, indexed on the basis of the sequence length, the channel model statistics and the estimated Slepian-Wolf bound rate. The output of step 407 is the Slepian-Wolf code rate. In the final step 408, the Slepian-Wolf code-rate computed in Step 407 and the channel model computed in step 405 are output. These represent the output of the rate estimation method.

While the invention has been described in terms of a preferred embodiment and alternative embodiments, those skilled in the art will recognize that the invention can be practiced with modification within the spirit and scope of the appended claims.

Having thus described our invention, what we claim as new and desire to secure by Letters Patent is as follows:

1. A method for low-complexity Slepian-Wolf rate estimation in a hybrid Wyner-Ziv video encoder, which determines the minimum Slepian-Wolf rate required to allow correct decoding, comprising the steps of:

generating an intensity field interpolated from temporally neighboring frames;

subsampling of a current frame and interpolated intensity field to reduce the number of samples and complexity in subsequent steps;

transform domain conversing the current frame and the interpolated intensity field;

channel model estimation based on the subsampled transform domain coefficients of the current frame and the interpolated intensity field, which consists of determining one of a parameterized class of models which best fits the observed transform coefficients and prior channel model estimates;

Slepian-Wolf bound estimation which determines the Slepian-Wolf bound based on the channel model estimate; and code rate estimation which determines the correct Slepian-Wolf coding rate to use in encoding as a function of the sequence length to be Slepian-Wolf coded and the code structure of the available Slepian-Wolf codes, in addition to the channel model estimate and the Slepian-Wolf bound.

2. A method according to claim 1, wherein the generation of interpolated intensity information from temporally neighboring frames includes the steps of:

dense motion field interpolation for the current frame based on motion vectors of temporally neighboring differentially predicted frames;

motion field filtering to generate a regular block-wise motion field for the current frame;

intensity field interpolation based on the regular motion field and temporally neighboring frames.

3. A method according to claim 1, wherein the output of the said Slepian-Wolf codes comprises a combination of syndrome and parity bits of a channel code.

4. A method according to claim 3, wherein the channel code is a low-density parity check code.

5. A method according to claim 2, wherein the motion-field filtering is done on the basis of the said dense motion field and motion statistics including statistics which measure the accuracy of the motion vector at each pixel, and uses a space-varying linear filter whose weights are a function of the said accuracy statistics, wherein the statistics for a given motion vector are derived as a function of the intensity differences of pixels in previously encoded DPCM frames brought into correspondence by the vector.

6. A method according to claim 2, wherein the motion-field filtering uses a non-linear filter wherein the weights are a function of the deviation of each motion vector from its spatially neighboring motion vectors.

7. A method according to claim 2, wherein the intensity field interpolation is done by computing a linear function of intensity values from previously encoded DPCM frames, wherein the linear weights are a function of the frame indices.

8. A method according to claim 2, wherein the intensity field is interpolated as a non-linear weighted sum of intensity values from previously encoded DPCM frames, wherein the non-linear weights are a function of the deviation of the intensity block from one DPCM frame from the average value of the intensity blocks being summed.

9. A method according to claim 1, wherein the parameterized channel model is computed using an estimator which performs a maximum-likelihood update on previously computed channel statistics.

10. A method according to claim 1, wherein the parameterized channel model is computed using an low-complexity approximate maximum-likelihood estimator which combines statistics derived from the current sets of transform coefficients and previously computed channel statistics.

11. A method according to claim 1, wherein the Slepian-Wolf bound is computed as a function of the quantizer to be used in Wyner-Ziv encoding, the estimated channel model statistics, and the expected statistics of the decoder side-information.

12. A method according to claim 11, wherein the Slepian-Wolf bound for a plurality of channel model statistics, quantizers, and decoder side-information statistics is pre-computed prior to Wyner-Ziv encoding and is stored in look-up tables in memory, to reduce Wyner-Ziv encoding complexity.

13. A method according to claim 1, wherein the Slepian-Wolf code rate estimation is done using density evolution for the available Slepian-Wolf codes.

14. A method according to claim 1, wherein the Slepian-Wolf code rate is analytically pre-computed as a function of the said statistics, and stored in look-up tables to reduce Wyner-Ziv encoding complexity.

15. A hybrid low-complexity Wyner-Ziv video encoder comprising:
a frame classifier which receives an input video frame and makes a decision on whether the frame should be encoded as a Wyner-Ziv frame or a differentially predicted (DPCM) video frame;
a DPCM video encoder which receives a frame that is to be encoded as a DPCM video frame where it is encoded using motion estimation, transform coding, quantization and entropy coding;
a DPCM frame buffer which temporarily stores DPCM video frames output by the DPCM video encoder;
a Wyner-Ziv encoder which receives a frame that is to be encoded as a Wyner-Ziv frame, the Wyner-Ziv encoder including an energy-compacting transform means, a quantizer, a Slepian-Wolf encoder and a rate estimator, the rate estimator using a current frame and frames from the DPCM frame buffer to estimate a Slepian-Wolf channel model statistics and a Slepian-Wolf code rate, the rate estimator outputting Slepian-Wolf channel model statistics to be used by a decoder for Slepian-Wolf decoding, the Slepian-Wolf code rate being input to the Slepian-Wolf encoder which uses the Slepian-Wolf code rate to determine an appropriate Slepian-Wolf code to use in order to compress quantized transform coefficients of a current video frame; and
a multiplexer which receives a DPCM encoded bitstream from the DPCM video encoder, the Wyner-Ziv encoded bitstream from the Slepian-Wolf encoder, and the channel model statistics which, together, are output by the multiplexer to constitute a compressed representation of the video sequence.

16. A hybrid low-complexity Wyner-Ziv video encoder according to claim 15, wherein the rate estimator comprises:

a dense motion field interpolator which receives reconstructions of previously encoded DPCM frames and their motion information from the DPCM frame buffer generates a pixel-wise dense motion field for the current frame as a function of previous motion vectors, the goodness of fit of previous motion information, and the frame indices of the current frame and previous DPCM frames;
a motion field filter which receives the dense motion field from the dense motion field interpolater and generates a regular, block-wise coarse motion field for the current frame;
an intensity field interpolator which receives the block-wise motion field generated by motion field filter and computes an intensity field on the basis of the block-wise motion field and the intensities of previously encoded DPCM frames;
a subsampler which receives the interpolated intensity field and generates a small subset of samples from the interpolated field and which also receives the current input frame and generates a small subset of samples from the current input frame;
transform means which receives both sets of samples from the subsampler and computes corresponding energy-compacting transforms from the samples;
a channel model estimator which receives the two sets of transformed samples and estimates statistics of a virtual channel between a source frame, output from the frame classifier, and decoder side-information, the statistics estimation being computed as a function of previously computed statistics stored in a channel statistics history buffer, the two sets of transform coefficients obtained from the transform means, and a choice of parameterized probability distributions, the channel statistics history buffer receiving the estimated channel model statistics;
a Slepian-Wolf bound estimator which receives the estimated channel model statistics and computes an ideal Slepian-Wolf coding rate from the estimated channel model, the computed channel model statistics and the quantizer; and
a code rate estimator which receives the Slepian-Wolf bound rate and the channel model statistics are input to the code rate estimator and determines an encoding rate to be used for the non-ideal Slepian-Wolf codes available to the Wyner-Ziv encoder for encoding, the encoding rate being estimated as a function of the sequence length to be Slepian-Wolf coded and the code structure of the available Slepian-Wolf codes, in addition to the channel model statistics and the Slepian-Wolf bound rate.

17. A hybrid Wyner-Ziv video encoder according to claim 15, wherein to reduce encoding complexity, the Slepian-Wolf bound estimater reads, while computing the Slepian-Wolf bound, appropriate entries from look-up tables based on the estimated channel model statistics and the quantizer; and
the code rate estimator reads, while computing encoding rate, appropriate entries from look-up tables based on the sequence length to be Slepian-Wolf coded, the code structure of the available Slepian-Wolf codes,
the channel model statistics and the Slepian-Wolf bound rate.

* * * * *